US012652397B2

(12) United States Patent
Kidani

(10) Patent No.: US 12,652,397 B2
(45) Date of Patent: Jun. 9, 2026

(54) IMAGE DECODING DEVICE, IMAGE DECODING METHOD, AND PROGRAM

(71) Applicant: KDDI CORPORATION, Tokyo (JP)

(72) Inventor: Yoshitaka Kidani, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 63 days.

(21) Appl. No.: 18/430,484

(22) Filed: Feb. 1, 2024

(65) Prior Publication Data

US 2024/0171752 A1 May 23, 2024

Related U.S. Application Data

(63) Continuation of application No. PCT/JP2022/029748, filed on Aug. 3, 2022.

(30) Foreign Application Priority Data

Aug. 5, 2021 (JP) ................................. 2021-129394

(51) Int. Cl.
*H04N 19/159* (2014.01)
*H04N 19/11* (2014.01)
*H04N 19/119* (2014.01)
*H04N 19/142* (2014.01)
*H04N 19/176* (2014.01)

(52) U.S. Cl.
CPC ........... *H04N 19/159* (2014.11); *H04N 19/11* (2014.11); *H04N 19/119* (2014.11); *H04N 19/142* (2014.11); *H04N 19/176* (2014.11)

(58) Field of Classification Search
CPC .. H04N 19/176; H04N 19/142; H04N 19/593; H04N 19/119; H04N 19/50; H04N 19/52; H04N 19/11; H04N 19/159; H04N 19/105
See application file for complete search history.

(56) References Cited

U.S. PATENT DOCUMENTS

| | | | |
|---|---|---|---|
| 12,075,028 B2 * | 8/2024 | Lee ...................... | H04N 19/119 |
| 2010/0208818 A1 * | 8/2010 | Yin ........................ | H04N 19/13 |
| | | | 375/E7.243 |

(Continued)

FOREIGN PATENT DOCUMENTS

| | | | | |
|---|---|---|---|---|
| WO | 2020106190 A1 | 5/2020 | | |
| WO | WO-2022228420 A1 * | 11/2022 | ............. | H04N 19/70 |

OTHER PUBLICATIONS

International Search Report (ISR) (and an English language translation thereof) dated Oct. 18, 2022, issued in International Application No. PCT/JP2022/029748.

(Continued)

*Primary Examiner* — Tsion B Owens
(74) *Attorney, Agent, or Firm* — Holtz, Holtz & Volek PC

(57) ABSTRACT

In an image decoding device according to the present invention, a circuit (241/242): derives motion information for a geometric partitioning mode to generate a motion compensation sample; and derives an intra prediction mode for the geometric partitioning mode to generate an intra-predicted sample; and a buffer (244) stores or outputs prediction information including motion information or an intra prediction mode of a block to be decoded to which the geometric partitioning mode is applied and a prediction type with which whether inter prediction or intra prediction has been applied can be determined.

18 Claims, 17 Drawing Sheets

(56) References Cited

U.S. PATENT DOCUMENTS

| | | | |
|---|---|---|---|
| 2021/0281870 A1 | 9/2021 | Solovyev et al. | |
| 2023/0033501 A1* | 2/2023 | Chen | H04N 19/44 |
| 2023/0188711 A1* | 6/2023 | Xu | H04N 19/11 375/240.02 |
| 2023/0319265 A1* | 10/2023 | Wang | H04N 19/70 375/240.12 |
| 2024/0098279 A1* | 3/2024 | Chen | H04N 19/172 |
| 2024/0129478 A1* | 4/2024 | Deng | H04N 19/105 |
| 2024/0155109 A1* | 5/2024 | Deng | H04N 19/159 |
| 2024/0187633 A1* | 6/2024 | Deng | H04N 19/70 |
| 2024/0373042 A1* | 11/2024 | Deng | H04N 19/184 |

OTHER PUBLICATIONS

Written Opinion dated Oct. 18, 2022, issued in International Application No. PCT/JP2022/029748.

"ITU-T H.266 Versatile Video Coding", Series H: Audiovisual and Multimedia Systems; Infrastructure of audiovisual services—Coding of moving video, Aug. 2020.

Blaser, et al., "Description of SDR and 360° video coding technology proposal by RWTH Aachen University", Joint Video Experts Team (JVET) of ITU-T SG 16 WP 3 and ISO/IEC JTC 1/SC 29/WG 11. JVET-J0023-v1, 10th Meeting: San Diego. US. Apr. 2018. pp. 1-14.

Chang, et al., "Compression efficiency methods beyond VVC", Joint Video Experts Team (JVET) of ITU-T SG 16 WP 3 and ISO/IEC JTC 1/SC 29. JVET-U0100. 21st Meeting, by teleconference. Jan. 2021. pp. 1-27.

Kidani, et al., "AHG12: GPM with inter and intra prediction", Joint Video Experts Team (JVET) of ITU-T SG 16 WP 3 and ISO/IEC JTC 1/SC 29. JVET-W0110-v2. 23rd Meeting, by teleconference. Jul. 2021. pp. 1-3.

Kidani, et al., "EE2-related: Combination of JVET-X0078 (Test 7/8), JVET-X0147 (Proposal-2), and GPM direct motion storage", Joint Video Experts Team (JVET) of ITU-T SG 16 WP 3 and ISO/IEC JTC 1/SC 29, JVET-X0166-v3, 24th Meeting, by teleconference. Oct. 2021. pp. 1-5.

Xiu, et al., "EE2-related: Combination of EE2-3.3, EE2-3.4 and EE2-3.5", Joint Video Experts Team (JVET) of ITU-T SG 16 WP 3 and ISO/IEC JTC 1/SC 29.JVET-W0097-v2. 23rd Meeting, by teleconference, Jul. 2021. pp. 1-5.

Yu, et al., "Modifications of motion storage in geometric partition mode", Joint Video Experts Team (JVET) of ITU-T SG 16 WP 3 and ISO/IEC JTC 1/SC 29/WG II, JVET-R0213, 18th Meeting: by teleconference. Apr. 2020. pp. 1-5.

* cited by examiner

FIG. 5

|  | L0 MV | L1 MV |
|---|---|---|
| MergeCandList[m, n] |  |  |
| 0 | x |  |
| 1 |  | x |
| 2 | x |  |
| 3 |  | x |
| 4 | x |  |

PARTITION LINE L

PARTITIONED AREA A

WEIGHT COEFFICIENTw = 0~9

1~7: Blending AREA
0, 8: Non-Blending AREA

BLOCK TO BE DECODED

PARTITIONED AREA B

FIG. 9

Table 1 — Specification of angleIdx and distanceIdx based on merge_gpm_partition_idx

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 16 | 18 | 18 | 18 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

FIG. 10

Table 1 – Specification of the geometric
partitioning distance array disLut

| idx | 0 | 2 | 3 | 4 | 5 | 6 | 8 | 10 | 11 | 12 | 13 | 14 |
|---|---|---|---|---|---|---|---|---|---|---|---|---|
| disLut[ idx ] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[ idx ] | −8 | −8 | −8 | −4 | −4 | −2 | 0 | 2 | 4 | 4 | 8 | 8 |

FIG. 11

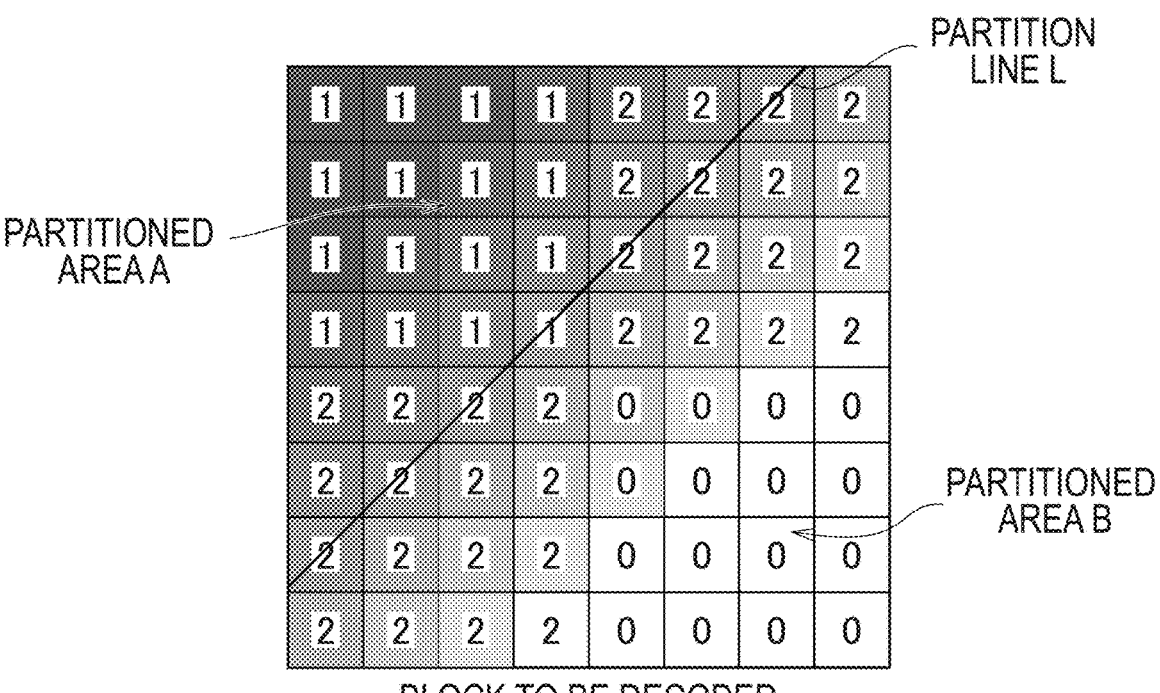

BLOCK TO BE DECODED

NON-PATENT LITERATURE 1
  STORED MOTION INFORMATION TYPE= 0~2
  0: STORE MOTION INFORMATION OF ONLY PARTITIONED AREA A
  1: STORE MOTION INFORMATION OF ONLY PARTITIONED AREA B
  2: MOTION INFORMATION OF BOTH PARTITIONED AREAS A AND B
    OR ONLY B

PRESENT EMBODIMENT
  STORED PREDICTION INFORMATION TYPE= 0~2
  0: STORE PREDICTION INFORMATION OF ONLY PARTITIONED AREA A
  1: STORE PREDICTION INFORMATION OF ONLY PARTITIONED AREA B
  2: PREDICTION INFORMATION OF BOTH PARTITIONED AREAS A AND B
    OR ONLY B

FIG. 12

| STORED MOTION INFORMATION OR PREDICTION INFORMATION | NON-PATENT LITERATURE 1 | PRESENT EMBODIMENT |
|---|---|---|
| PREDICTION TYPE | | O |
| predFlagL0 | O | O |
| predFlagL1 | O | O |
| mvL0 | O | O |
| mvL1 | O | O |
| refIdxL0 | O | O |
| refIdxL1 | O | O |
| INTRA PREDICTION MODE | | O |
| BcwIdx | O | O |
| hpelfIdx | | O(optional) |
| IBC_flag | | O(optional) |
| LIC_flag | | O(optional) |

FIG. 13

| sType&& PREDICTION TYPE→ ↓ STORED PREDICTION INFORMATION | 0 && Intra | 2 && (Intra + Inter) | 1 && Inter |
|---|---|---|---|
| PREDICTION TYPE | Intra | Inter | Inter |
| predFlagL0 | 1 or 0 | 1 | 1 or 0 |
| predFlagL1 | 0 or 1 | 1 | 0 or 1 |
| mvL0 | mvA or 0 | mvA or mvB | mvB or 0 |
| mvL1 | 0 or mvA | mvB or mvA | 0 or mvB |
| refIdxL0 | refIdxA or -1 | refIdxA or refIdxB | refIdxB or -1 |
| refIdxL1 | -1 or refIdxA | refIdxB or refIdxA | -1 or refIdxB |
| INTRA PREDICTION MODE | NOT TO BE STORED | NOT TO BE STORED | NOT TO BE STORED |
| BcwIdx | VALUE INDICATING INVALIDITY | VALUE INDICATING INVALIDITY | VALUE INDICATING INVALIDITY |
| hpelIfIdx | VALUE INDICATING INVALIDITY | VALUE INDICATING INVALIDITY | VALUE INDICATING INVALIDITY |
| IBC_flag | VALUE INDICATING INVALIDITY | VALUE INDICATING INVALIDITY | VALUE INDICATING INVALIDITY |
| LIC_flag | VALUE INDICATING INVALIDITY | VALUE INDICATING INVALIDITY | VALUE INDICATING INVALIDITY |

FIG. 14

| sType&& PREDICTION TYPE→ ↓ STORED PREDICTION INFORMATION | 0 && Intra | 2 && (Intra + Inter) | 1 && Inter |
|---|---|---|---|
| PREDICTION TYPE | Intra | Inter | Inter |
| predFlagL0 | 0 | 1 or 0 | 1 or 0 |
| predFlagL1 | 0 | 0 or 1 | 0 or 1 |
| mvL0 | 0 | mvB or 0 | mvB or 0 |
| mvL1 | 0 | 0 or mvB | 0 or mvB |
| refIdxL0 | -1 | refIdxB or -1 | refIdxB or -1 |
| refIdxL1 | -1 | -1 or refIdxB | -1 or refIdxB |
| INTRA PREDICTION MODE | modeX | modeX | NOT TO BE STORED |
| BcwIdx | VALUE INDICATING INVALIDITY | VALUE INDICATING INVALIDITY | VALUE INDICATING INVALIDITY |
| hpelfIdx | VALUE INDICATING INVALIDITY | VALUE INDICATING INVALIDITY | VALUE INDICATING INVALIDITY |
| IBC_flag | VALUE INDICATING INVALIDITY | VALUE INDICATING INVALIDITY | VALUE INDICATING INVALIDITY |
| LIC_flag | VALUE INDICATING INVALIDITY | VALUE INDICATING INVALIDITY | VALUE INDICATING INVALIDITY |

FIG. 15

| sType&& PREDICTION TYPE→ ↓ STORED PREDICTION INFORMATION | 0 && Intra | 2 && (Intra + Inter) | 1 && Inter |
|---|---|---|---|
| PREDICTION TYPE | Intra | Inter | Inter |
| predFlagL0 | 0 | 0 | 0 |
| predFlagL1 | 0 | 0 | 0 |
| mvL0 | 0 | 0 | 0 |
| mvL1 | 0 | 0 | 0 |
| refIdxL0 | -1 | -1 | -1 |
| refIdxL1 | -1 | -1 | -1 |
| INTRA PREDICTION MODE | modeX | modeX or modeY | modeY |
| BcwIdx | VALUE INDICATING INVALIDITY | VALUE INDICATING INVALIDITY | VALUE INDICATING INVALIDITY |
| hpelfIdx | VALUE INDICATING INVALIDITY | VALUE INDICATING INVALIDITY | VALUE INDICATING INVALIDITY |
| IBC_flag | VALUE INDICATING INVALIDITY | VALUE INDICATING INVALIDITY | VALUE INDICATING INVALIDITY |
| LIC_flag | VALUE INDICATING INVALIDITY | VALUE INDICATING INVALIDITY | VALUE INDICATING INVALIDITY |

IMAGE DECODING DEVICE, IMAGE DECODING METHOD, AND PROGRAM

CROSS-REFERENCE TO RELATED APPLICATIONS

The present application is a continuation of PCT Application No. PCT/JP2022/029748, filed on Aug. 3, 2022, which claims the benefit of Japanese patent application No. 2021-129394 filed on Aug. 5, 2021, the entire contents of which are incorporated herein by reference in its entirety.

TECHNICAL FIELD

The present invention relates to an image decoding device, an image decoding method, and a program.

BACKGROUND ART

Non Patent Literature 1 discloses a geometric partitioning mode (GPM).

The GPM diagonally divides a rectangular block into two and performs motion compensation on each of the two blocks. Specifically, in the GPM, each of the two partitioned regions is motion-compensated by a motion vector in a merge mode, and is blended by weighted averaging. As the oblique partitioning pattern, sixty-four patterns are prepared according to the angle and the displacement.

CITATION LIST

Non Patent Literature

Non Patent Literature 1: ITU-T H.266/VVC
Non-Patent Literature 2: JVET-U0100, "Compression efficiency methods beyond VVC"
Non-Patent Literature 3: JVET-W0097, "EE2-related Combination of EE2-3.3, EE2-3.4 and EE2-3.5"

However, since the GPM disclosed in Non Patent Literature 1 is limited to the merge mode, there is a problem that there is room for improvement in coding performance.

Therefore, the present invention has been made in view of the above-described problems, and an object of the present invention is to provide an image decoding device, an image decoding method, and a program capable of improving coding performance by defining prediction information and a method of storing the prediction information in a case where an intra prediction mode is added in GPM.

The first aspect of the present invention is summarized as an image decoding device including a circuit and a buffer, wherein the circuit: derives motion information for a geometric partitioning mode to generate a motion compensation sample; and derives an intra prediction mode for the geometric partitioning mode to generate an intra-predicted sample; and the buffer stores or outputs prediction information including motion information or an intra prediction mode of a block to be decoded to which the geometric partitioning mode is applied and a prediction type with which whether inter prediction or intra prediction has been applied can be determined.

The second aspect of the present invention is summarized as an image decoding device including a circuit and a buffer, wherein the circuit derives motion information for a geometric partitioning mode to generate a motion compensation sample; the circuit derives an intra prediction mode for the geometric partitioning mode to generate an intra-predicted sample; the buffer stores or outputs prediction information including motion information or an intra prediction mode of a block to be decoded to which the geometric partitioning mode is applied, and a prediction type with which whether inter prediction or intra prediction has been applied can be determined; and the circuit performs weighted averaging on the motion compensation sample and the intra predicted sample with a predetermined weight value to blend a new prediction sample.

The third aspect of the present invention is summarized as an image decoding device including a circuit and a buffer, wherein the circuit derives motion information for a geometric partitioning mode to generate a motion compensation sample; the circuit derives an intra prediction mode for the geometric partitioning mode to generate an intra-predicted sample; the buffer stores or outputs prediction information including motion information or an intra prediction mode of a block to be decoded to which the geometric partitioning mode is applied, and a prediction type with which whether inter prediction or intra prediction has been applied can be determined; and the circuit determines a boundary strength value at the time of applying a deblocking filter for a block boundary and apply the deblocking filter.

The fourth aspect of the present invention is summarized as an image decoding method, including: deriving motion information for a geometric partitioning mode to generate motion compensation samples; deriving an intra prediction mode for the geometric partitioning mode to generate an intra predicted sample; and storing or outputting prediction information including motion information or an intra prediction mode of a block to be decoded to which the geometric partitioning mode is applied, and a prediction type with which whether inter prediction or intra prediction has been applied can be determined.

The fifth aspect of the present invention is summarized as a program stored on a non-transitory computer-readable medium for causing a computer to function as an image decoding device, the image decoding device including a circuit and a buffer, wherein the circuit: derives motion information for a geometric partitioning mode to generate a motion compensation sample; and derives an intra prediction mode for the geometric partitioning mode to generate an intra-predicted sample; and the buffer stores or output prediction information including motion information or an intra prediction mode of a block to be decoded to which the geometric partitioning mode is applied, and a prediction type with which whether inter prediction or intra prediction has been applied can be determined.

According to the present invention, it is possible to provide an image decoding device, an image decoding method, and a program capable of improving coding performance by defining prediction information and a method of storing the prediction information in a case where an intra prediction mode is added in GPM.

BRIEF DESCRIPTION OF THE DRAWINGS

FIG. 5 is a diagram illustrating a method for building a merge candidate list disclosed in Non-Patent Literature 1.

FIG. 9 is a diagram illustrating an example of angleIdx that defines an angle of a partition line of the GPM.

FIG. 10 is a diagram illustrating an example of disLut.

FIG. 11 is a diagram illustrating an example in which a stored prediction information type disclosed in Non-Patent Literature 1 and a stored prediction information type according to the present embodiment are specified for each 4×4 sample sub-block.

FIG. 12 is a diagram illustrating a list of motion information disclosed in Non-Patent Literature 1 and prediction information according to the present embodiment, which are stored according to a value of sType of sub-blocks configuring a GPM-applied block.

FIG. 13 is a diagram illustrating an example of prediction information stored in the GPM including two different inter predictions as illustrated in FIG. 4.

FIG. 14 is a diagram illustrating an example of the prediction information stored for a GPM including the intra prediction and the inter prediction in FIG. 6.

FIG. 15 is a diagram illustrating an example of the prediction information stored for the GPM including two different intra predictions as illustrated in FIG. 7.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

First Embodiment

Figure 1:
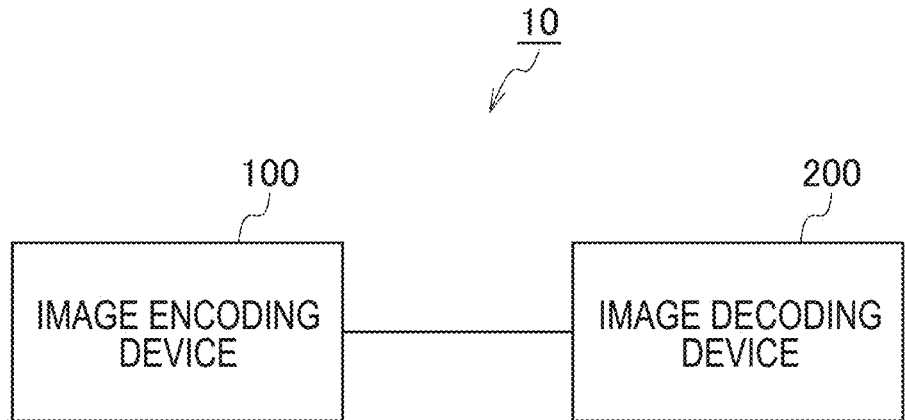
FIG. 1 is a diagram illustrating an example of a configuration of an image processing system 1 according to an embodiment.

Hereinafter, an image processing system 10 according to a first embodiment of the present invention will be described with reference to FIGS. 1 to 15. FIG. 1 is a diagram illustrating the image processing system 10 according to the present embodiment.

The image coding device 100 is configured to generate coded data by coding an input image signal (picture). The image decoding device 200 is configured to generate an output image signal by decoding the coded data.

The coded data may be transmitted from the image coding device 100 to the image decoding device 200 via a transmission path. The coded data may be stored in a storage medium and then provided from the image coding device 100 to the image decoding device 200.

The coded data may be transmitted from the image coding device 100 to the image decoding device 200 via a transmission path. The coded data may be stored in a storage medium and then provided from the image coding device 100 to the image decoding device 200.

(Image Coding Device 100)

Figure 2:
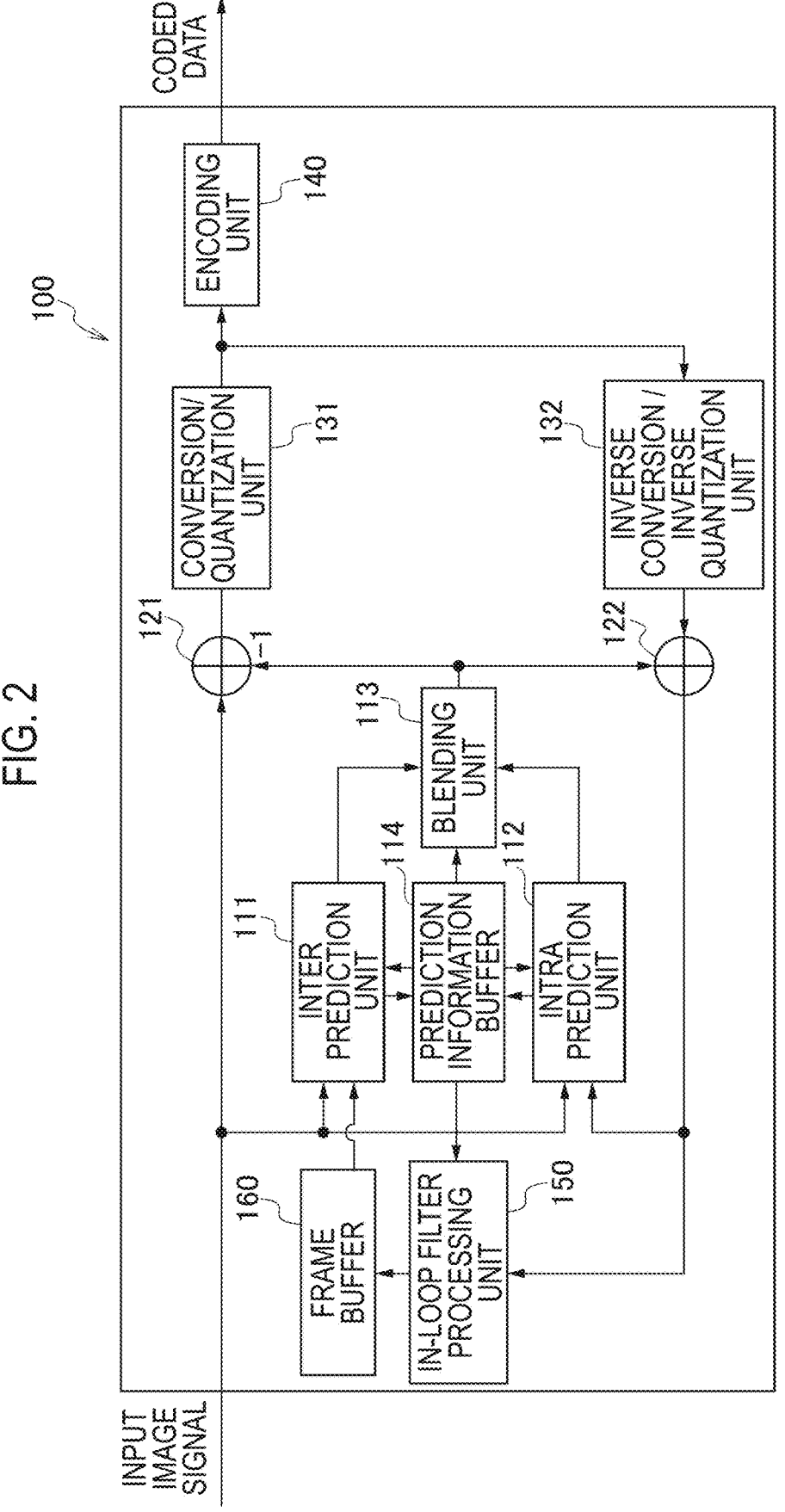
FIG. 2 is a diagram illustrating an example of functional blocks of an image encoding device 100 according to an embodiment.

Hereinafter, the image coding device 100 according to the present embodiment will be described with reference to FIG. 2. FIG. 2 is a diagram illustrating an example of functional blocks of the image coding device 100 according to the present embodiment.

As shown in FIG. 2, the image coding device 100 includes an inter prediction unit 111, an intra prediction unit 112, a blending unit 113, a prediction information buffer 114, a subtractor 121, an adder 122, a transform/quantization unit 131, an inverse transform/inverse quantization unit 132, an encoding unit 140, an in-loop filtering processing unit 150, and a frame buffer 160.

The inter prediction unit 111 is configured to generate a prediction signal by inter prediction (inter-frame prediction).

Specifically, the inter prediction unit 111 is configured to specify a reference block included in a reference frame by comparing a frame to be coded (hereinafter, referred to as a target frame) with the reference frame stored in the frame buffer 160, and determine a motion vector (mv) for the specified reference block. Here, the reference frame is a frame different from the target frame.

The inter prediction unit 111 is configured to generate the prediction signal included in a block to be coded (hereinafter, referred to as a target block) for each target block based on the reference block and the motion vector.

The inter prediction unit 111 is configured to output the inter prediction signal to the blending unit 113.

Although not illustrated in FIG. 2, the inter prediction unit 111 is configured to output information related to inter prediction control (specifically, information such as an inter prediction mode, a motion vector, a reference frame list, and a reference frame number) to the encoding unit 140.

The intra prediction unit 112 is configured to generate a prediction signal by intra prediction (intra-frame prediction).

Specifically, the intra prediction unit 112 is configured to specify the reference block included in the target frame, and generate the prediction signal for each target block based on the specified reference block. Here, the reference block is a block referred to for the target block. For example, the reference block is a block adjacent to the target block.

Furthermore, the intra prediction unit 112 is configured to output the intra prediction signal to the blending unit 113.

Furthermore, although not illustrated in FIG. 2, the intra prediction unit 112 is configured to output information (specifically, information such as an intra prediction mode) regarding control of intra prediction to the encoding unit 140.

The blending unit 113 is configured to blend the inter prediction signal input from the inter prediction unit 111 and/or the intra prediction signal input from the intra prediction unit 112 using a preset weighting factor, and output the blended prediction signal (hereinafter, collectively referred to as a prediction signal) to the subtractor 121 and the adder 122.

The prediction information buffer 114 is configured to store prediction information input from the inter prediction unit 111 or the intra prediction unit 112, or output the stored prediction information to the inter prediction unit 111, the intra prediction unit 112, the blending unit 113, or the in-loop filter processing unit 150. Here, details of the prediction information will be described later.

Here, regarding the blending processing of the inter prediction signal and/or the intra prediction signal by the blending unit 113, the same configuration as that of Non Patent Literature 1 can be adopted in the present embodiment, and thus the description thereof will be omitted.

The subtractor 121 is configured to subtract the prediction signal from the input image signal, and output a prediction residual signal to the transform/quantization unit 131. Here, the subtractor 121 is configured to generate the prediction residual signal that is a difference between the prediction signal generated by intra prediction or inter prediction and the input image signal.

The adder 122 is configured to add the prediction signal output from the blending unit 113 to the prediction residual signal output from the inverse transformation/inverse quantization unit 132 to generate a decoded signal before filtering, and output the decoded signal before filtering to the intra prediction unit 112 and the in-loop filter processing unit 150.

Here, the pre-filtering decoded signal constitutes the reference block used by the intra prediction unit 112.

The transform/quantization unit 131 is configured to perform transform processing for the prediction residual signal and acquire a coefficient level value.
Furthermore, the transform/quantization unit 131 may be configured to perform quantization of the coefficient level value.

Here, the transform processing is transforming the prediction residual signal into a frequency component signal. In such transform processing, a kernel pattern (transformation matrix) corresponding to discrete cosine transform (Hereinafter referred to as DCT) may be used, or a kernel pattern (transformation matrix) corresponding to discrete sine transform (Hereinafter referred to as DST) may be used.

Furthermore, as the transform processing, multiple transform selection (MTS) that enables selection of a transform kernel suitable for deviation of the coefficient of the prediction residual signal from the plurality of transform kernels disclosed in Non Patent Literature 1 for each of the horizontal and vertical directions, or low frequency-non-separable transform (LFNST) that improves the coding performance by further concentrating the transform coefficient after the primary transform in the low frequency region may be used.

The inverse transform/inverse quantization unit 132 is configured to perform inverse transform processing for the coefficient level value output from the transform/quantization unit 131. Here, the inverse transform/inverse quantization unit 132 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

The encoding unit 140 is configured to code the coefficient level value output from the transform/quantization unit 131 and output coded data.

Here, for example, the coding is entropy coding in which codes of different lengths are assigned based on a probability of occurrence of the coefficient level value.

Furthermore, the encoding unit 140 is configured to code control data used in decoding processing in addition to the coefficient level value.

Here, the control data may include size data such as a coding block (coding unit (CU)) size, a prediction block (prediction unit (PU)) size, and a transform block (transform unit (TU)) size.

Furthermore, the control data may include information (flag and index) necessary for control of the inverse transformation/inverse quantization processing of the inverse transformation/inverse quantization unit 220, the inter prediction signal generation processing of the inter prediction unit 241, the intra prediction signal generation processing of the intra prediction unit 242, the blending processing of the inter prediction signal or/and the intra prediction signal of the blending unit 243, the filter processing of the in-loop filter processing unit 250, and the like in the image decoding device 200 described later.

Note that, in Non Patent Literature 1, these pieces of control data are referred to as syntaxes, and the definition thereof is referred to as semantics.

Furthermore, the control data may include header information such as a sequence parameter set (SPS), a picture parameter set (PPS), and a slice header as described later.

The in-loop filtering processing unit 150 is configured to execute filtering processing on the pre-filtering decoded signal output from the adder 122 and output the filtered decoded signal to the frame buffer 160.

Herein, for example, the filter processing is deblocking filter processing, which reduces the distortion generated at boundary parts of blocks (encoded blocks, prediction blocks, or conversion blocks), or adaptive loop filter processing, which switches filters based on filter coefficients, filter selection information, local properties of picture patterns of an image, etc. transmitted from the image encoding device 100.

The frame buffer 160 is configured to accumulate the reference frames used by the inter prediction unit 111.

Here, the filtered decoded signal constitutes the reference frame used by the inter prediction unit 111.
(Image Decoding Device 200)

Figure 4:
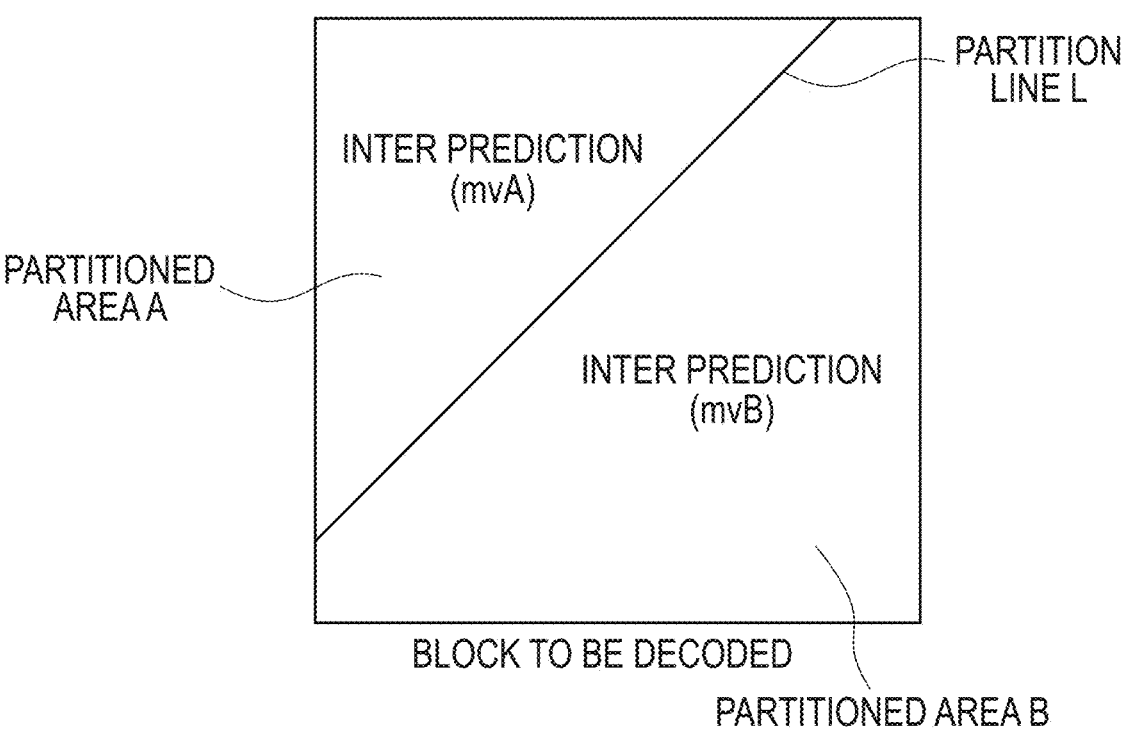
FIG. 4 is a diagram illustrating an example of a case where a rectangular block to be decoded is partitioned into two areas of a partitioned area A and a partitioned area B of a geometric shape by a partition line of a geometric partitioning mode according to the geometric partitioning mode disclosed in Non-Patent Literature 1.

Hereinafter, the image decoding device 200 according to the present embodiment will be described with reference to FIG. 4. FIG. 4 is a diagram illustrating an example of functional blocks of the image decoding device 200 according to the present embodiment.

Figure 3:
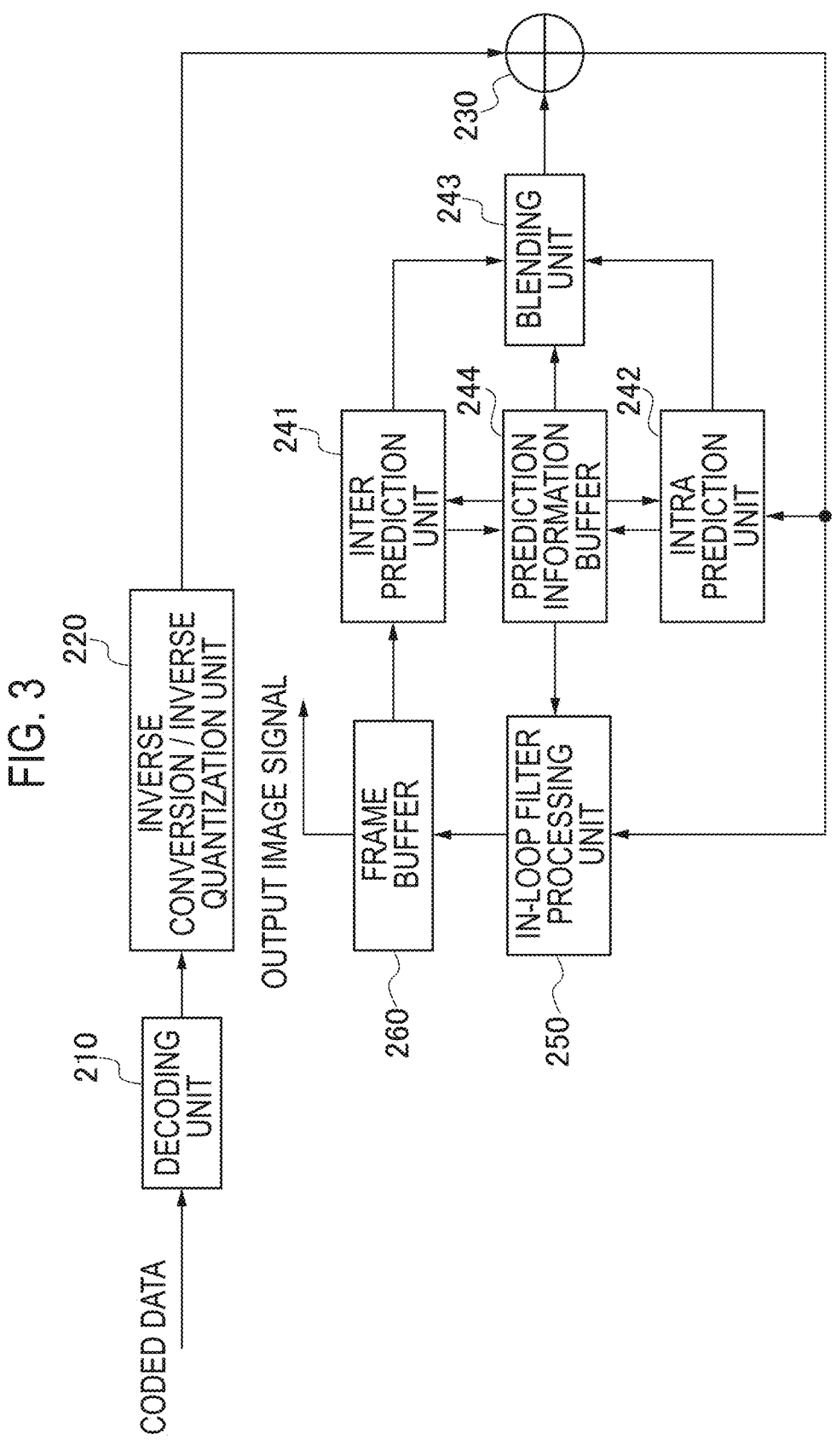
FIG. 3 is a diagram illustrating an example of functional blocks of an image decoding device 200 according to an embodiment.

As illustrated in FIG. 3, the image decoding device 200 includes a decoding unit 210, an inverse transform/inverse quantization unit 220, an adder 230, an inter prediction unit 241, an intra prediction unit 242, a blending unit 243, a prediction information buffer 224, an in-loop filtering processing unit 250, and a frame buffer 260.

The decoding unit 210 is configured to decode the coded data generated by the image coding device 100 and decode the coefficient level value.

Here, the decoding is, for example, entropy decoding performed in a reverse procedure to the entropy coding performed by the encoding unit 140.

Furthermore, the decoding unit 210 may be configured to acquire control data by decoding processing for the coded data.

Here, the control data may include information related to the block size of the decoded block (synonymous with a block to be encoded in the above-described image encoding device 100, hereinafter, collectively referred to as a target block) described above.

Furthermore, the control data may include information (flag or index) necessary for control of the inverse transformation/inverse quantization processing of the inverse transformation/inverse quantization unit 220, the predicted sample generation processing of the inter prediction unit 241 or the intra prediction unit 242, the filter processing of the in-loop filter processing unit 250, and the like.

Furthermore, the control data may include header information such as a sequence parameter set (SPS), a picture parameter set (PPS), a picture header (PH), or a slice header (SH) described above.

The inverse transform/inverse quantization unit 220 is configured to perform inverse transform processing for the coefficient level value output from the decoding unit 210. Here, the inverse transform/inverse quantization unit 220 may be configured to perform inverse quantization of the coefficient level value prior to the inverse transform processing.

Here, the inverse transform processing and the inverse quantization are performed in a reverse procedure to the transform processing and the quantization performed by the transform/quantization unit 131.

Similarly to the inter prediction unit 111, the inter prediction unit 241 is configured to generate a prediction signal by inter prediction (inter-frame prediction).

Specifically, the inter prediction unit 241 is configured to generate the prediction signal for each prediction block based on the motion vector decoded from the coded data and the reference signal included in the reference frame. The inter prediction unit 241 is configured to output the prediction signal to the adder 230.

Similarly to the intra prediction unit 112, the intra prediction unit 242 is configured to generate a prediction signal by intra prediction (intra-frame prediction).

Specifically, the intra prediction unit 242 is configured to specify the reference block included in the target frame, and generate the prediction signal for each prediction block based on the specified reference block. The intra prediction unit 242 is configured to output the prediction signal to the adder 230.

Like the blending unit 113, the blending unit 243 is configured to blend the inter prediction signal input from the inter prediction unit 241 and/or the intra prediction signal input from the intra prediction unit 242 using a preset weighting factor, and output the blended prediction signal (hereinafter, collectively referred to as a prediction signal) to the adder 230.

Similarly to the prediction information buffer 114, the prediction information buffer 244 is configured to store prediction information input from the inter prediction unit 221 or the intra prediction unit 222, or output the stored prediction information to the inter prediction unit 241, the intra prediction unit 242, the blending unit 243, or the in-loop filter processing unit 250. Here, details of the prediction information will be described later.

The adder 230 is configured to add the prediction signal output from the blending unit 243 to the prediction residual signal output from the inverse transform/inverse quantization unit 220 to generate a pre-filtering decoded signal, and output the pre-filtering decoded signal to the in-loop filtering processing unit 250.

Here, the decoded signal before filtering configures a reference block used by the intra prediction unit 242.

Similarly to the in-loop filtering processing unit 150, the in-loop filtering processing unit 250 is configured to execute filtering processing on the pre-filtering decoded signal output from the adder 230 and output the filtered decoded signal to the frame buffer 260.

Herein, for example, the filter processing is deblocking filter processing, which reduces the distortion generated at boundary parts of blocks (encoded blocks, prediction blocks, conversion blocks, or sub-blocks obtained by dividing them), or adaptive loop filter processing, which switches filters based on filter coefficients, filter selection information, local properties of picture patterns of an image, etc. transmitted from the image encoding device 100.

Similarly to the frame buffer 160, the frame buffer 260 is configured to accumulate the reference frames used by the inter prediction unit 241.

Here, the filtered decoded signal constitutes the reference frame used by the inter prediction unit 241.

(Geometric Partitioning Mode)

Hereinafter, with reference to FIGS. 4 and 5, application of the geometric partitioning mode disclosed in Non Patent Literature 1 related to the decoding unit 210, the inter prediction unit 241, and the intra prediction unit 242 and the first geometric partitioning mode (GPM) according to the present embodiment to the intra prediction mode will be described.

FIG. 4 illustrates an example of a case where a rectangular decoding target block is partitioned into two regions of partitioned region 0 and partitioned region 1 of a geometric shape by a partitioning line L1 of the geometric partitioning mode according to the geometric partitioning mode disclosed in Non Patent Literature 1.

Here, sixty-four patterns of the partitioning line L1 of the geometric partitioning mode disclosed in Non Patent Literature 1 are prepared according to the angle and the displacement.

Furthermore, the GPM according to Non Patent Literature 1 applies a normal merge mode, which is a type of inter prediction, to each of the partitioned region 0 and the partitioned region 1 to generate an inter predicted (motion-compensated) sample.

Specifically, in such a GPM, a merge candidate list disclosed in Non-Patent Literature 1 is built, a motion vector (mvA, mvB) and a reference frame of each partitioned area A/B are derived on the basis of the merge candidate list and two merge indexes (merge_gpm_idx0, merge_gpm_idx1) for each partitioned area A/B transmitted from the image encoding device 100, and a reference block, that is, an inter prediction (or motion compensation) block is generated. Finally, the inter prediction samples of each partitioned area A/B are weighted and averaged by a preset weight and blended.

FIG. 5 is a diagram illustrating a method of building a merge candidate list disclosed in Non-Patent Literature 1.

As illustrated in FIG. 5, such a merge candidate list includes a list 0 (L0) and a list 1 (L1) indicating two prediction directions, and lists a plurality of motion information candidates to be described later for each list.

The motion information of the partitioned area A/B of the GPM disclosed in Non-Patent Literature 1 is derived by merge_gpm_idx0/merge_gpm_idx1 for the partitioned area A/B and a merge candidate list (MergeCandList [m, n]) for the GPM illustrated in FIG. 5.

Here, in order to prevent the pieces of motion information derived based on merge_gpm_idx0 and merge_gpm_idx1 from overlapping as much as possible, the list number from which the motion information selected by merge_gpm_idx0 and merge_gpm_idx1 is derived has a nested structure with an even number and an odd number of MergeCandList as illustrated in X of FIG. 5.

Specifically, the following m and n are calculated on the basis of merge_gpm_idx0 and merge_gpm_idx1.

$$m=merge\_gpm\_idx0\ [xCb][yCb]$$

$$n=merge\_gpm\_idx1[xCb][yCb]+((merge\_gpm\_idx1 \\ [xCb][yCb]>=m)?1:0)$$

Based on the value of m calculated in this manner, the motion vector, the reference frame index, and the prediction list flag configuring the motion information of the partitioned area A are derived as follows.

First, the value of X is calculated from m & 0×01 (determination of whether the value of m is an even number) and n & 0×01 (determination of whether the value of n is an even number). Here, when the calculated X is 0, the value of X is set to (1-X).

Finally, the motion vector mvA of the partitioned area A, the reference frame index refIdxA, the prediction list flag preListFlagA, the motion vector mvB of the partitioned area B, the reference frame index refIdxB, and the prediction list flag preListFlagB are derived as follows.

mvA=mvLXM refIdxA=refIdxLXM preListFlagA=X mvB=mvLXN refIdxB=refIdxLXN preListFlagB=X Here, M and N are numbers of merge candidates indicated by m and n in the merge candidate list, respectively, that is, M=MergeCandList [m]

N=MergeCandList [n].

Figure 6:
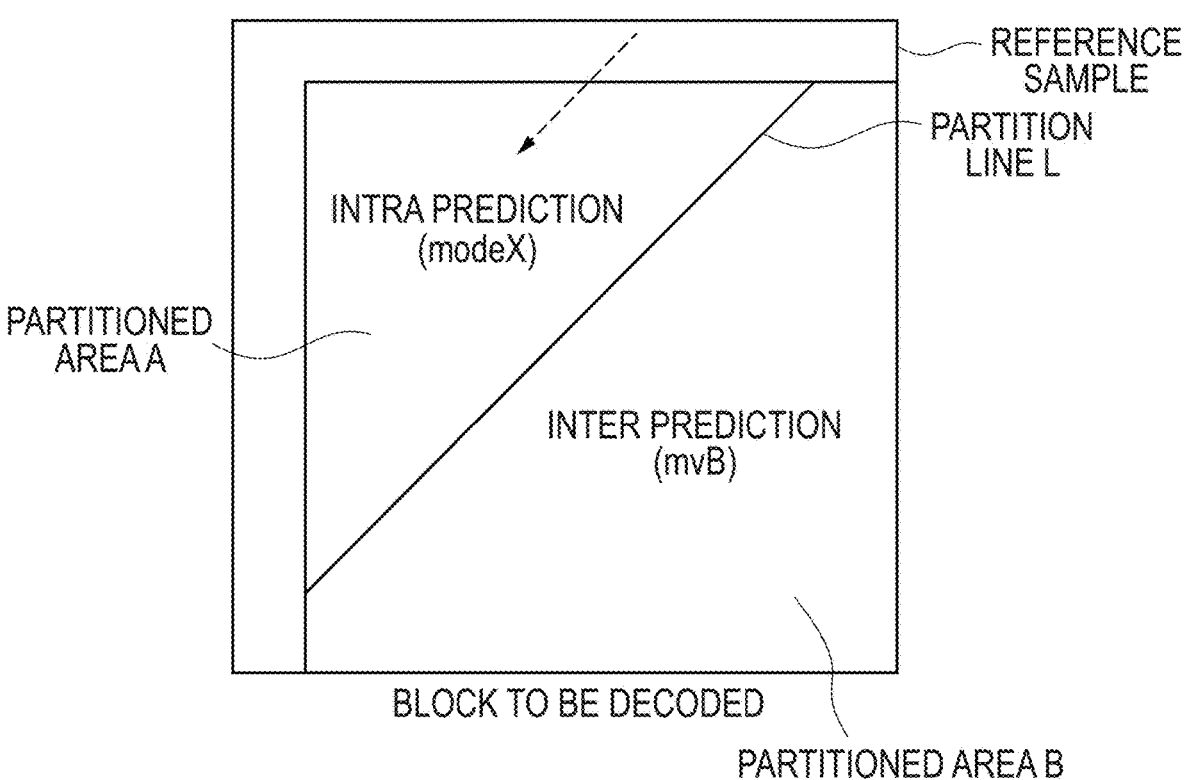
FIG. 6 illustrates an example of application of an intra prediction mode to a GPM according to the present embodiment.
Figure 7:
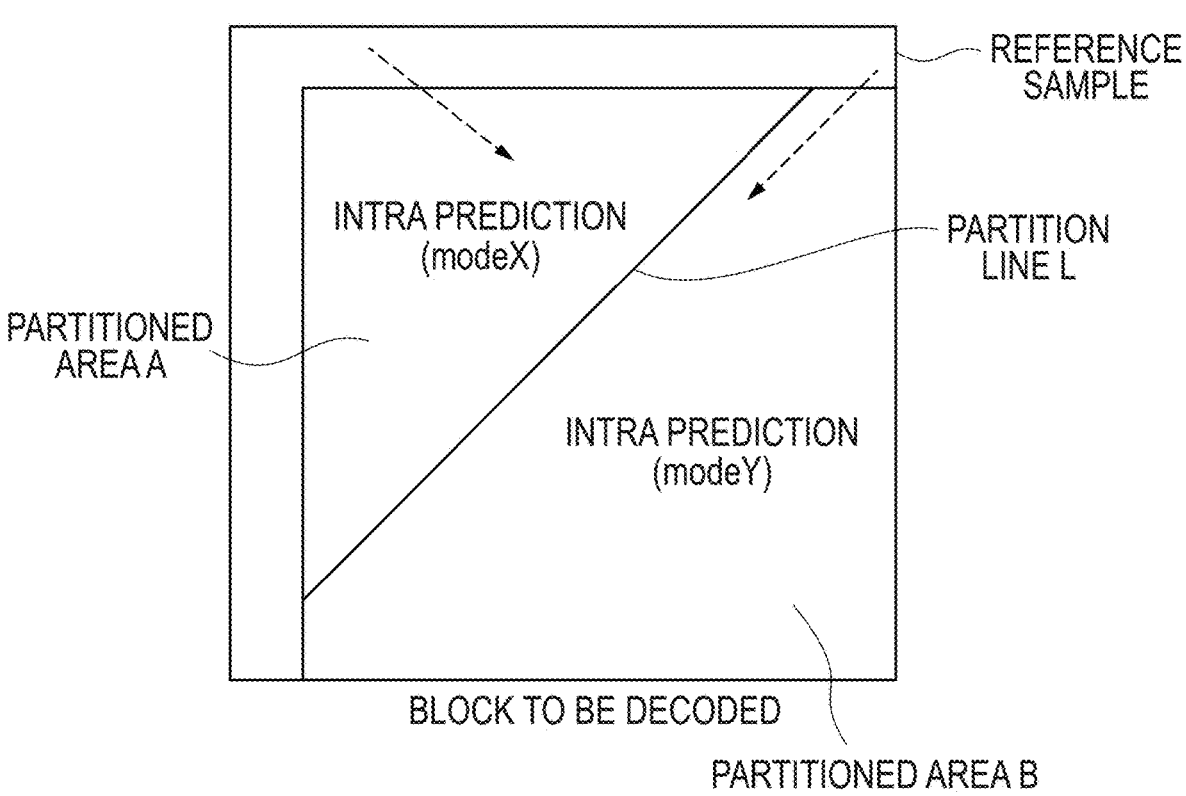
FIG. 7 illustrates an example of application of an intra prediction mode to the GPM according to the present embodiment.

FIGS. 6 and 7 illustrate an example of application of the intra prediction mode to the GPM according to the present embodiment.

Specifically, FIG. 6 illustrates a configuration example of the GPM according to the present embodiment in a case where the intra prediction (modeX) and the inter prediction are applied to each partitioned area A/B. FIG. 7 illustrates a configuration example of the GPM according to the present embodiment in a case where two different intra predictions (modex, modeY) are applied to A/B of each partitioned area.

Here, in the first GPM according to the present embodiment, either the normal merge mode or the intra prediction mode can be applied to each partitioned area A/B, and the type of the intra prediction mode is limited according to the partition shape (partition line) of the target block.

Furthermore, in the second GPM according to the present embodiment, a method of specifying the application possibility of the GPM to which the intra prediction mode is additionally applied in the block to be decoded and the prediction mode type in each of the partitioned areas A/B when the GPM is applied is defined.

Consequently, the GPM to which the intra prediction mode is additionally applied is appropriately applied to the block to be decoded, and the optimum prediction mode is specified, as a result of which the coding performance can be further improved.

(GPM Weighting Factor)

Hereinafter, the weighting coefficient w of the GPM according to Non-Patent Literature 1 and the present embodiment related to the decoding unit 210, the inter prediction unit 241, the intra prediction unit 242, and the blending unit 243 will be described with reference to FIGS. 8 to 10.

Figure 8:
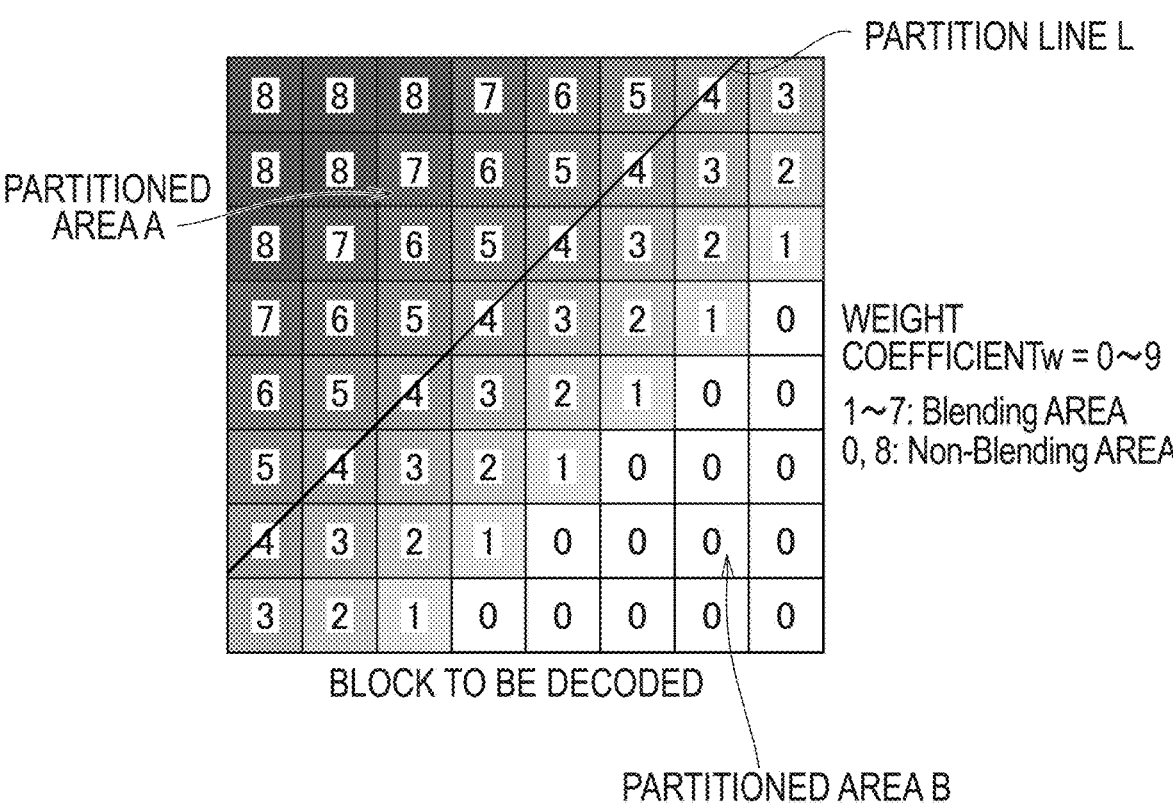
FIG. 8 is a diagram illustrating an example of a value of a weighting coefficient w for a predicted sample of each partitioned area A/B of GPM according to Non-Patent Literature 1 and the present embodiment.

FIG. 8 is a diagram illustrating an example of a value of the weighting coefficient w for a predicted sample of each partitioned area A/B of the GPM according to Non-Patent Literature 1 and the present embodiment.

The predicted samples of the respective partitioned areas A/B generated by the inter prediction unit 241 or the intra prediction unit 242 are blended (weighted average) by the weight coefficient w in the blending unit 243.

In Non-Patent Literature 1, a value of 0 to 8 is used as the value of the weighting coefficient w, and such a value of the weighting coefficient w may also be used in the present embodiment. Here, the values 0 and 8 of the weighting coefficient w indicate a non-blending area (non-blending area), and the values 1 to 7 of the weighting coefficient w indicate a blending area (blending).

Note that, in the present embodiment, the calculation method of the weighting coefficient w can be configured to be calculated as follows from the offset value (offsetX, offsetY) calculated from the sample position (xL, yL) and the target block size, the displacement (diplacementX, diplacementY) calculated from angleIdx that defines the angle of the partition line of the geometric partitioning mode (GPM) illustrated in FIG. 9, and the table value disLut calculated from diplacementX and diplacementY illustrated in FIG. 10, by a method similar to Non-Patent Literature 1.

$$weightIdx=(((xL+offsetX)<<1)+1)xdisLut[diplace-\\ mentX]+(((yL+offsetY)<<1)+1)xdisLut[diplace-\\ mentY]$$

$$weightIdxL=partFlip?32+weightIdx: 32-weightIdx$$

$$w=Clip3(0,8,(weightIdxL+4)>>3)$$

(Stored Motion Information Type and Stored Prediction Information Type)

Hereinafter, the stored motion information type disclosed in Non-Patent Literature 1 and the stored prediction information type according to the present embodiment in the decoding unit 210, the inter prediction unit 241, the intra prediction unit 242, and the prediction information buffer 244 will be described with reference to FIG. 11.

FIG. 11 is a diagram illustrating an example in which the stored prediction information type disclosed in Non-Patent Literature 1 and the stored prediction information type according to the present embodiment are specified for each 4×4 sample sub-block.

Those types are the same in the calculation methods as described below, but as illustrated in FIG. 8, are different in that the stored information is motion information in Non-Patent Literature 1, but is prediction information in the present embodiment.

First, similarly to Non-Patent Literature 1, the value of the stored motion information type and the value of the stored prediction information type (since the calculation method is the same, hereinafter, for convenience, any value is defined as sType.) are calculated as follows from an index (xSbIdx, ySbIdx) in units of 4×4 sample sub-blocks, the offset value (offsetX, offsetY) calculated similarly to the weighting coefficient w described above, the displacement (diplacementX, diplacementY), and the table (disLut).

$$motionIdx=(((4xxSbIdx+offsetX)<<1)+5)xdisLut$$
$$[diplace\ mentX]+(((4xySbIdx+offsetY)<<1)+5)$$
$$xdisLut[diplacementY]$$

$$sType=Abs\ (motionIdx)<32?2:\ (motionIdx<=0?(1-$$
$$isFlip):\ isFlip)$$

Here, as illustrated in FIG. 11, the value of sType includes three types of values of 0, 1, and 2, and the motion information and the prediction information stored in the prediction information buffer 244 are controlled by the inter prediction unit 241 and the intra prediction unit 242 as follows according to the respective values.

In a case where the value of sType is 0, the motion information of the partitioned area A is stored in Non-Patent Literature 1, and the prediction information of the partitioned area A is stored in the present embodiment.

In a case where the value of sType is 1, the motion information of the partitioned area B is stored in Non-Patent Literature 1, and the prediction information of the partitioned area B is stored in the present embodiment.

In a case where the value of sType is 2, in Non-Patent Literature 1, the motion information of the partitioned area A and the partitioned area B or the motion information of only the partitioned area B is stored, and in the present embodiment, the prediction information of the partitioned area A and the partitioned area B or the prediction information of only the partitioned area B is stored.

Here, the motion information and the prediction information to be stored will be described later.

Note that the calculation unit of sType described above and the storage unit of motion information or prediction information described later may be changed from the 4×4 sample sub-block unit described above with intention of a designer.

Specifically, in order to reduce the amount of information to be stored, a unit of calculation of sType described above and a unit of storage of motion information or prediction information described later may be increased to 8×8 samples, 16×16 samples, or the like.

Alternatively, although the amount of information to be stored increases, the calculation unit of sType described above and the storage unit of motion information or prediction information described later may be reduced to 2×2 samples or the like in order to improve the accuracy of motion information or prediction information when referred from another block or frame.

(Motion Information and Prediction Information Stored in Prediction Information Buffer)

The motion information disclosed in Non-Patent Literature 1 and the prediction information according to the present embodiment, which are stored in the prediction information buffer 244 from the inter prediction unit 241 will be described below with reference to FIGS. 12 and 13.

FIG. 12 is a diagram illustrating a list of the motion information disclosed in Non-Patent Literature 1 and the prediction information according to the present embodiment, which are stored according to the value of sType of the sub-block configuring the GPM-applied block.

First, the motion information finally stored in the GPM disclosed in Non-Patent Literature 1 includes the following parameters.

Prediction direction (predFlagL0, predFlagL1)
Motion vectors (mvL0, mvL1) of L0 and L1
Reference frame indexes (refIdxL0, refIdxL1) of L0 and L1
BcwIdx Note that the prediction direction (predFlagL0, predFlagL1) is a parameter indicating a prediction direction of a sub-block stored according to sType to be described later, and is classified into three types of L0 piece prediction, L1 piece prediction, and L0/L1 binary prediction on the basis of a value of predFlagL0 and a value of predFlagL1.

Here, the L0 piece prediction is an inter prediction based on one motion vector derived from the L0 list, and a case where predFlagL0 is 1 and predFlagL1 is 0 is stored as a value indicating this condition.

In addition, the L1 piece prediction is an inter prediction based on one motion vector derived from the L1 list, and a case where predFlagL0 is 0 and predFlagL1 is 1 is stored as a value indicating this condition.

In addition, the L0/L1 bi-prediction is an inter prediction based on two motion vectors derived from each of the L0 list and the L1 list, and a case where predFlagL0 is 1 and predFlagL1 is 1 is stored as a value indicating this condition.

The motion vectors (mvL0, mvL1) of L0 and L1 are motion vectors for the list numbers L0 and L1 described above.

Further, the reference frame indexes (refIdxL0, refIdxL1) of L0 and L1 are indexes indicating reference frames referred to by mvL0 and mvL1, respectively.

In addition, BcwIdx is an index for specifying a value of a weight coefficient of BCW (Bi-prediction with CU-level weights) disclosed in Non-Patent Literature 1.

As shown in FIG. 12, the prediction type and the intra prediction mode are added to the motion information stored in the prediction information buffer 244 disclosed in Non-Patent Literature 1 as parameters to be stored as the prediction information stored in the prediction information buffer 244 in the present embodiment.

Here, the prediction type is an internal parameter indicating either inter prediction (Inter) or intra prediction (Intra) as illustrated in FIG. 12.

Furthermore, as illustrated in FIG. 12, hpeIfIdx, IBC Flag, or LIC Flag may be added as the prediction information according to the present embodiment.

Here, hpeIfIdx and IBC Flag are flags that specify whether to apply a SIF (Switchable Interpolation Filter) and an IBC (Intra Block Copy) disclosed in Non-Patent Literature 1 and a LIC (Local Illumination Compensation) disclosed in Non-Patent Literature 2, respectively.

(Details of Prediction Information Stored According to Stored Prediction Information Type)

Details of the prediction information stored in the prediction information buffer 244 by the inter prediction unit 241 or the intra prediction unit 242 according to the stored prediction information type sType according to the present embodiment will be described below with reference to FIGS. 13 to 15.

FIG. 13 is a diagram illustrating an example of prediction information stored for a GPM including two different inter predictions as illustrated in FIG. 4. Hereinafter, details of each piece of prediction information saved according to the value of sType will be described.

First, that the prediction type is inter prediction (Inter) in all sType areas is stored in the prediction information buffer 244.

Second, predFlagL0, predFlagL1, mvL0, mvL1, refIdxL0, and refIdxL1 are stored as follows according to the value of sType and the values of predListFlagA and predListFlagB indicating the list number of the merge candidate list indicating the derivation destination of the motion vector of the partitioned area A/B described above, similarly to the method disclosed in Non-Patent Literature 1.

First, when sType=0, the following calculation is performed.

$$predFlagL0=(predListFlagA==0)?1:0$$

$$predFlagL1=(predListFlagA==0)?0:1$$

$$refIdxL0=(predListFlagA==0)?refIdxA:-1$$

$$refIdxL1=(predListFlagA==0)?-1: refIdxA$$

$$mvL0=(predListFlagA==0)?mvA: 0$$

$$mvL1=(predListFlagA==0)?0:mvA$$

Next, in a case of sType=1 or in a case of sType=2 and predListFlagA+predListFlagB #1, calculation is performed as follows.

$$predFlagL0=(predListFlagB==0)?1:0$$

$$predFlagL1=(predListFlagB==0)?0:1$$

$$refIdxL0=(predListFlagB==0)?refIdxB:-1$$

$$refIdxL1=(predListFlagB==0)?-1: refIdxB$$

$$mvL0=(predListFlagB==0)?mvB: 0$$

$$mvL1=(predListFlagB==0)?0:mvB$$

Here, predListFlagA+predListFlagB+1 indicates a case where the list numbers of the partitioned areas A/B coincide with each other. At this time, in order to avoid duplication of motion vectors, only the motion vectors of the partitioned area B are stored even in the case of sType=2.

Next, in a case of sType=2 and predListFlagA+predListFlagB=1, calculation is performed as follows.

$$predFlagL0=1$$

$$predFlagL1=1$$

$$refIdxL0=(predListFlagA==0)?refIdxA: refIdxB$$

$$refIdxL1=(predListFlagA==0)?refIdxB: refIdxA$$

$$mvL0=(predListFlagA==0)?mvA: mvB$$

$$mvL1=(predListFlagA==0)?mvB: mvA$$

Here, predListFlagA+predListFlagB=1 indicates a case where the list numbers of the partitioned areas A/B do not match. At this time, the two motion vectors of the partitioned areas A/B are stored as they are.

Note that, although not illustrated in FIG. 13, the above-described mvL0 and mvL1 may store motion vectors before being corrected by Merge with Motion Vector Difference (MMVD) or Template Matching (Inter™) for the GPM disclosed in Non-Patent Literature 2.

Alternatively, mvL0 and mvL1 described above may be motion vectors corrected by MMVD or Inter™ for GPM disclosed in Non-Patent Literature 2.

When the corrected motion vector is stored, the prediction accuracy of the prediction block that acquires the motion vector from the GPM-applied block and generates the prediction sample is improved.

On the other hand, in a case where the motion vector before correction is stored, improvement in prediction accuracy of the prediction block that refers to the motion vector from the GPM cannot be expected, but the derivation processing of the motion vector of the reference block to the GPM application block can be started without waiting for completion of the MMVD and the Inter-™ processing on the GPM block, so that a reduction in decoding processing time can be expected.

Note that which of the motion vectors before and after the correction is stored can be similarly selected for FIGS. 13 to 15 described later.

Next, the intra prediction mode may not be stored in all sType areas. Alternatively, a value indicating that intra prediction is invalid in all sType areas may be stored. This is because, in the configuration illustrated in FIG. 13, since all the areas are inter prediction, there is no intra prediction mode applied to the target block.

Next, values indicating that BcwIdx, hpelfIdx, IBC Flag, and LIC Flag are invalid values in all sType areas may be stored. This is because all of BCW, SIF, IBC, and LIC are encoding tools exclusive to GPM, and thus it is obvious that these coding tools are invalid in the target block to which GPM is applied.

In relation, although not shown in FIGS. 12 and 13, the motion vectors used in IBC may not be stored, or 0 vectors may be stored. These parameters can have a similar configuration in FIGS. 14 and 15 to be described later, and thus the detailed description of these parameters in FIGS. 14 and 15 will be omitted below.

FIG. 14 is a diagram illustrating an example of prediction information stored for a GPM configured by intra prediction and inter prediction as illustrated in FIG. 6. Hereinafter, details of each piece of prediction information stored according to the value of sType will be described.

First, since the prediction information stored in the partitioned area (the partitioned area of Inter) to which the inter prediction is applied in the case of sTyper=1 can have the same configuration as the prediction information of the same area described in FIG. 13, the description will be omitted.

Secondly, the prediction information stored in the partitioned area (Intra partitioned area) to which intra prediction is applied when sTyper=0 is stored as follows as illustrated in FIG. 14.

Prediction type=Intra $$predFlag0=0$$

$$predFlag1=0$$

$$mvL0=0$$

$$mvL1=0$$

$$refIdxL0=-1$$

$$refIdxL1=-1$$

intra prediction mode=modeX

Here, since intra prediction is applied to such a partitioned area, Intra is stored as the prediction type, and modeX is stored as the intra prediction mode, as described above.

Note that, as a modified example, for example, as in Non-Patent Literature 1, in a case where only an coding tool that refers only to the intra prediction type in units of sub-blocks from the neighbor and does not refer to the intra prediction mode is included, a configuration may be employed in which the intra prediction mode is not saved while Intra is saved as the prediction type.

On the other hand, since there is no motion information, as described above, 0 may be stored as predFlag0 and predFlagL1, 0 (meaning a 0 vector) may be stored as mvL0 and mvL1, and −1 (meaning that there is no reference frame) may be stored as refIdxL0 and refIdxL1.

Alternatively, as a modification, in order to avoid a tight capacity of the buffer area of the prediction information buffer 244, the motion information may not be stored.

Thirdly, the prediction information stored in the partitioned area (the partitioned area of Intra+Inter) to which the intra prediction and the inter prediction are applied in the case of sTyper=2 is stored as follows as illustrated in FIG. 14.

Prediction type=Inter predFlag0=(predListFlagB==0)?1:0 predFlag1=(predListFlagB==0)?0:1 refIdxL0=(predListFlagB==0)?refIdxB:−1 refIdxL1=(predListFlagB==0)?−1: refIdxB mvL0=(predListFlagB==0)?mvB: 0 mvL1=(predListFlagB==0)?0:mvB intra prediction mode=modeX

Here, since the intra prediction of sType=1 is applied in such a partitioned area, the same parameters as those stored in sType=1 are stored as the prediction type and the intra prediction mode among the prediction information as described above.

Furthermore, in such a partitioned area, since the inter prediction of sType=2 is applied, the same parameters as those stored with sType=2 are stored as the parameters related to the motion field information among the prediction information as described above.

FIG. 15 is a diagram illustrating an example of prediction information stored for a GPM including two different intra predictions as illustrated in FIG. 7. Hereinafter, details of each piece of prediction information saved according to the value of sType will be described.

Firstly, among the prediction information stored in all the sType areas, the parameters other than the intra prediction mode can have the same configuration as the parameters stored in the Intra partitioned area in the case of sType=0 described in FIG. 14, and thus the description thereof will be omitted.

Secondly, as the intra prediction modes of the area of sType=0 and the area of sType=1, as illustrated in FIG. 15, two different intra prediction modes modeX and modeY applied in each area are stored.

Third, in the area of sType=2, as illustrated in FIG. 15, both the intra prediction modes of the area of sType=0 and the area of sType=1 may be stored, or any one of the intra prediction modes may be stored.

For the former, for example, in a case where two intra prediction modes can be used in the image encoding device 100 and the image decoding device 200, two intra prediction modes may be stored.

For the latter, for example, the intra prediction mode of sType=0 may be selected as the intra prediction mode of sType=2 by decision.

Alternatively, for example, from which intra prediction mode the 4×4 sample sub-block is dominantly generated may be calculated, for example, in units of 2×2 sample sub-blocks obtained by further subpartitioning the 4×4 sample sub-block, and the dominant intra prediction mode may be selected as the intra prediction mode of the area of sType=2.

Alternatively, a smaller distance between the sub-block and the adjacent reference sample existing in the direction indicated by the two intra prediction modes of the sub-block may be selected as the intra prediction mode of sType=2.

With use of the prediction information and the method for storing the prediction information described above, it is possible to appropriately refer to the prediction information in a case where the intra prediction is added to the GPM from the inside of the frame or the outside of the frame, as a result of which improvement of the coding performance can be expected.

Note that, among the prediction information stored in the prediction information buffer 244 described above, parameters other than the intra prediction mode may be deleted from the prediction information buffer 244 in a case where the parameters are no longer referred to from inside or outside the frame.

In addition, when a storage area for the parameter is secured in the prediction information buffer 244, the storage area may be initialized. Here, timing at which reference from the outside of the frame is stopped is the same as the timing at which the frame including the GPM applied block is deleted from the frame buffer 260 (frame buffer 160).

Further, among the prediction information stored in the prediction information buffer 244, the intra prediction mode may be deleted from the prediction information buffer 244 when the intra prediction mode is no longer referred to from the frame. Furthermore, in a case where a storage area corresponding to the intra prediction mode is secured in the prediction information buffer 244, the storage area may be initialized.

(Weight Value Determination Control Method for Combined Inter and Intra Prediction when Geometric Partitioning Mode is Applied to Adjacent Block)

Hereinafter, a method in which the blending unit 243 controls the weight value determination of the combined inter and intra prediction of the block to be decoded when the geometric partitioning mode is applied to the adjacent block adjacent to the block to be decoded using the prediction information stored in the prediction information buffer 244 according to the present embodiment will be described with reference to FIG. 16.

Figure 16:
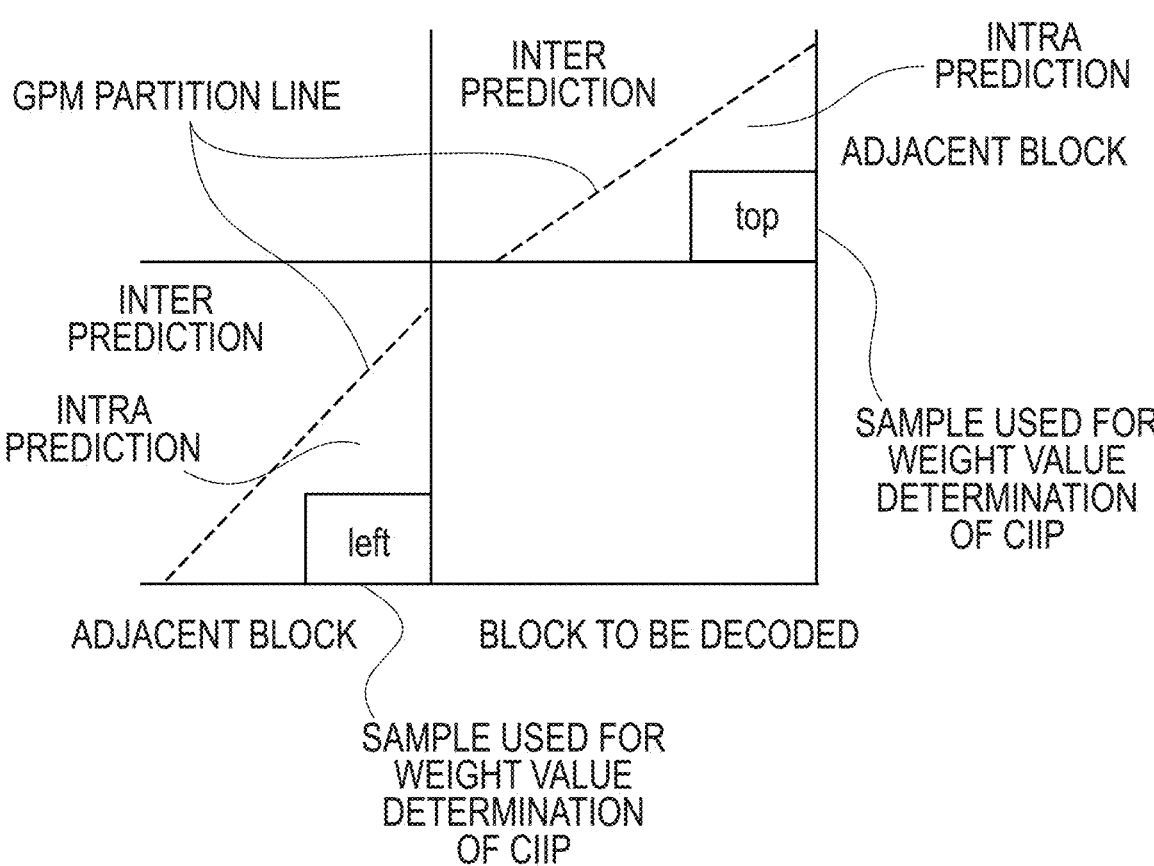
FIG. 16 is a diagram illustrating an example in which a blending unit 243 controls weight value determination of combined inter and intra prediction of a block to be decoded in a case where a geometric partitioning mode is applied to an adjacent block adjacent to the block to be decoded by using prediction information stored in a prediction information buffer 244 according to the present embodiment.

FIG. 16 is a diagram illustrating an example in which the blending unit 243 controls the weight value determination of the combined inter and intra prediction of the block to be decoded when the geometric partitioning mode is applied to the adjacent block adjacent to the block to be decoded using the prediction information stored in the prediction information buffer 244 according to the present embodiment.

Here, the combined inter and intra prediction (CIIP) disclosed in Non-Patent Literature 1 is a technology for combining a new predicted sample PCIIP by performing weighted averaging on an inter-predicted sample (motion compensation sample) PInter and an intra-predicted sample PIntra of a block to be decoded with a predetermined weight value wt.

The predetermined weight value wt is calculated as follows according to the prediction types of two adjacent blocks adjacent on the left and upper sides of the block to be decoded.

First, when the upper adjacent block is an intra-predicted block, the internal parameter isIntraTop is set to 1. Otherwise, isIntraTop is set to 0.

Next, when the left neighboring block is an intra-predicted block, the internal parameter isIntraLeft is set to 1. Otherwise, isIntraLeft is set to 0.

Next, according to isIntraTop and isIntraLeft, the weight value wt is determined in the following three patterns.

Firstly, if isIntraTop+isIntraLeft=2 (that is, when both of the two adjacent blocks are intra prediction blocks), wt=3 is set.

Secondly, when isIntraTop+isIntraLeft=1 (that is, when one of the two adjacent blocks is an intra prediction block and the other is an inter prediction block), wt=2 is set.

Third, in other cases (that is, when both of the two adjacent blocks are inter prediction blocks), wt=1 is set.

Finally, the blending unit 243 calculates PCIIP using the weight value wt as in the following expression.

$$PCIIP=((4\text{-}wt)\text{xPinter}+wt\text{xPintra}+2)>>2$$

In Non-Patent Literature 1, since the prediction type of the adjacent block is used in the determination of the weight value wt of the CIIP described above, for example, as illustrated in FIG. 16, in a case where GPM is applied to the adjacent block and GPM of the adjacent block is configured by inter prediction and intra prediction, the prediction type of the adjacent block is determined as inter prediction.

On the other hand, in the present embodiment, the weight value wt of the CIIP is determined by using the prediction type stored in units of 4×4 sample sub-blocks adjacent to the block to be decoded without using the prediction type of the adjacent block.

Note that the determination using the prediction type of the adjacent 4×4 sample sub-block may use the same determination expression as the adjacent block according to isIntraTop and isIntraLeft described above.

Accordingly, in the case as illustrated in FIG. 16, when the CIIP is applied to the block to be decoded and the GPM configured by the inter prediction and the intra prediction is applied to the adjacent block adjacent to the block to be decoded, the predetermined weight value wt of the CIIP of the block to be decoded can be determined using the prediction information appropriately stored in units of sub-blocks in consideration of the partitioned area of the GPM, so that the effect of improving the prediction performance can be expected.

(Boundary Strength Value Determination Control of Deblocking Filter when Geometric Partitioning Mode is Applied)

Hereinafter, a method in which the in-loop filter processing unit 250 according to the present embodiment controls a boundary strength value determination of the deblocking filter applied to the adjacent block boundary using the prediction information stored in the prediction information buffer 244 will be described with reference to FIG. 17.

Figure 17:
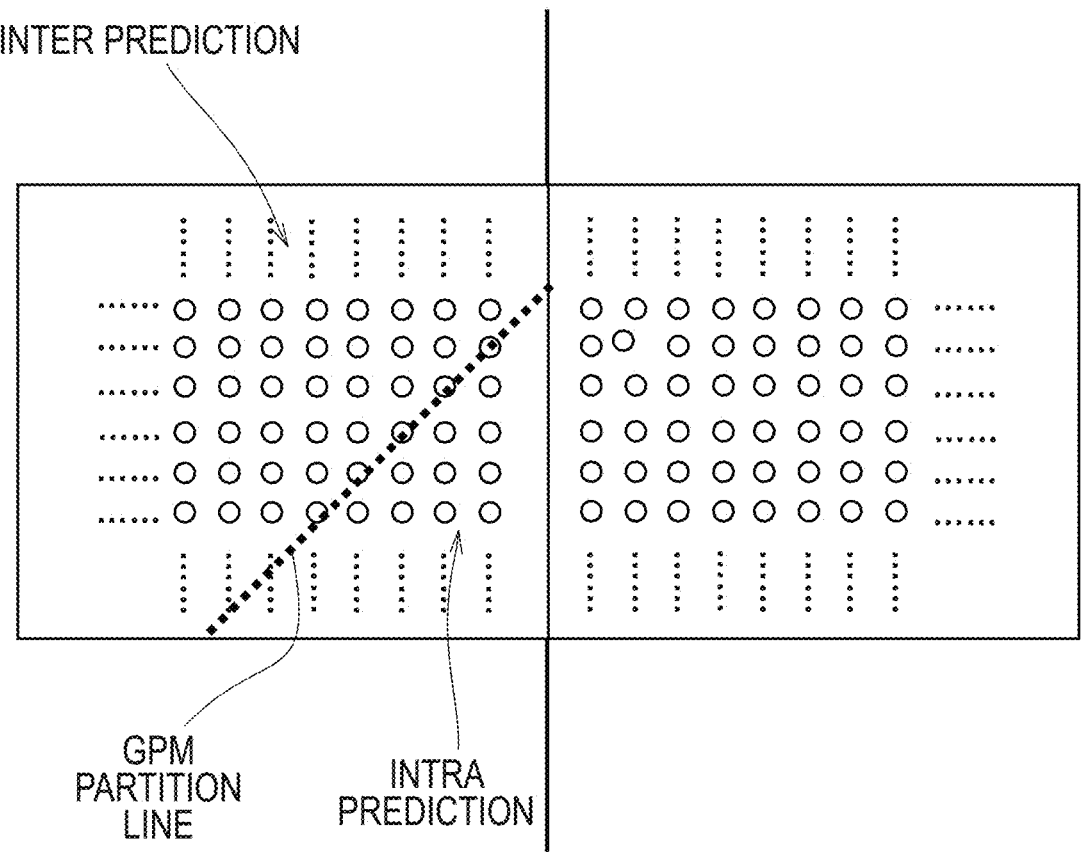
FIG. 17 is a diagram illustrating 17 illustrating an example of a deblocking filter applied to an adjacent block boundary by an in-loop filter processing unit 250.

FIG. 17 is a diagram illustrating an example of the deblocking filter applied to an adjacent block boundary by the in-loop filter processing unit 250.

Here, the deblocking filter disclosed in Non-Patent Literature 1 is a technique for smoothing block boundary distortions generated at adjacent block boundaries.

The deblocking filter is applied to both the luminance block and the color difference block, and whether or not the deblocking filter is applied to the luminance block or the filter strength is determined according to a value of a boundary strength (BS) to be described later, and whether or not the deblocking filter is applied to the color difference block or the filter strength is determined.

In determination conditions of the BS value to be determined disclosed in Non-Patent Literature 1, the in-loop filter unit 250 determines the respective values of a luminance signal (Y in FIG. 16) and a chroma signal (U and V in FIG. 16) for each of the following six conditions.

Condition 1: When the prediction type of at least one of the two blocks including a determination target sample is intra prediction or the CIIP flag indicates a valid value, the BS values of the Y component, the U component, and the V component of the determination target sample are set to 2, 2, and 2, respectively.

Condition 2: When at least one of the two blocks including the determination target sample has a non-zero coefficient, the BS values of the Y component, the U component, and the V component of the determination target sample are set to 1, 1, and 1, respectively.

Condition 3: When an IBC flag of one of the two blocks including the determination target sample indicates a valid value and the prediction type of the other block is inter prediction, the BS values of the Y component, the U component, and the V component of the determination target sample are set to 1, 1, and 1, respectively.

Condition 4: When the prediction type of the two blocks including the determination target sample is inter prediction, and an absolute value difference of MV of each block is 0.5 luminance samples or more, the BS values of the Y component, the U component, and the V component of the determination target sample are set to 1, 0, and 0, respectively.

Condition 5: In a case where the prediction types of the two blocks including the determination target sample are inter prediction, and the reference frames (that is, refIdx) of the respective blocks are different, the BS values of the Y component, the U component, and the V component of the determination target sample are set to 1, 0, and 0, respectively.

Condition 6: When the conditions 1 to 5 are not satisfied, the BS values of the Y component, the U component, and the V component of the determination target sample are set to 0, 0, and 0, respectively.

Here, as described above, Non-Patent Literature 1 has a configuration in which the determination of the prediction type of two blocks including the determination target sample, the determination of whether or not the blocks are CIIP-applied blocks, the determination of whether or not the blocks are IBC-applied blocks, and the determination of the absolute value difference of the motion vector are determined on the basis of the prediction type that the in-loop filter unit 250 has on a block-by-block basis and the flag on a block-by-block basis indicating whether or not CIIP or IBC is applied.

On the other hand, in the present embodiment, the in-loop filter unit 250 performs determination using the prediction information stored in the 4×4 sample sub-block in the prediction information buffer 244. That is, the conditions 1 to 6 described above are changed as follows.

Condition 1: When the prediction type of at least one of the two sub-blocks including the determination target sample is the intra prediction or the CIIP flag indicates a valid value, the BS values of the Y component, the U component, and the V component of the determination target sample are set to 2, 2, and 2, respectively.

Condition 2: When at least one of the two sub-blocks including the determination target sample has a non-zero coefficient, the BS values of the Y component, the U component, and the V component of the determination target sample are set to 1, 1, and 1, respectively.

Condition 3: When the IBC flag of one of the two sub-blocks including the determination target sample indicates a valid value and the prediction type of the other block is inter prediction, the BS values of the Y component, the U component, and the V component of the determination target sample are set to 1, 1, and 1, respectively.

Condition 4: When the prediction type of each of the two sub-blocks including the determination target sample is inter prediction, and the absolute value difference of MV of each block is 0.5 luminance samples or more, the BS values of the Y component, the U component, and the V component of the determination target sample are set to 1, 0, and 0, respectively.

Condition 5: When the prediction type of each of the two sub-blocks including the determination target sample is inter prediction, and the reference frames (that is, refIdx) of the respective blocks are different, the BS values of the Y component, the U component, and the V component of the determination target sample are set to 1, 0, and 0, respectively.

Condition 6: When the conditions 1 to 5 are not satisfied, the BS values of the Y component, the U component, and the V component of the determination target sample are set to 0, 0, and 0, respectively.

Note that, as described above, the BS value in the present embodiment may be the same value as the value of each condition in Non-Patent Literature 1 determined on the basis of the prediction information in units of blocks.

As a result, in the BS value determination of the deblocking filter for the application block of the GPM to which the intra prediction is added as illustrated in FIG. 17, since the BS value for the determination target sample can be accurately determined as compared with a configuration example disclosed in Non-Patent Literature 1, the smoothing of the block boundary distortion is optimized, as a result of which the coding performance is improved.

Further, the image encoding device 100 and the image decoding device 200 may be realized as a program causing a computer to execute each function (each step).

Note that the above described embodiments have been described by taking application of the present invention to the point cloud encoding device 10 and the point cloud decoding device 30 as examples. However, the present invention is not limited only thereto, but can be similarly applied to an encoding/decoding system having functions of the encoding device 10 and the decoding device 30.

According to the present embodiment, it is possible to improve the overall quality of service in video communications, thereby contributing to Goal 9 of the UN-led Sustainable Development Goals (SDGs) which is to "build resilient infrastructure, promote inclusive and sustainable industrialization and foster innovation".

What is claimed is:

1. An image decoding device comprising a circuit and a buffer, wherein:

the circuit:

derives motion information for a geometric partitioning mode to generate a motion compensation sample; and derives an intra prediction mode for the geometric partitioning mode to generate an intra-predicted sample;

the buffer stores or outputs prediction information including motion information or an intra prediction mode of a block to be decoded to which the geometric partitioning mode is applied, and a prediction type with which it can be determined whether inter prediction or intra prediction has been applied; and the circuit controls a content of the prediction information including motion information or an intra prediction mode applied to a block and a method of storing the prediction information, according to a stored prediction information type calculated in each sub-block configuring the block to be decoded.

2. The image decoding device according to claim 1, wherein when the stored prediction information type included in the sub-block indicates 0 or 1 and the prediction type included in the sub-block is the inter prediction, the circuit stores, in the buffer:

the inter prediction as the prediction type;

the motion information applied to the sub-block of which the stored prediction information type is 0 or 1, as the motion information; and nothing as the intra prediction mode.

3. The image decoding device according to claim 1, wherein when the stored prediction information type included in the sub-block indicates 2 and the prediction type included in the sub-block is configured by two different inter predictions applied to the sub-blocks in which the stored prediction information types are 0 and 1, the circuit stores, in the buffer:

the inter prediction as the prediction type;

the motion information which is not zero vector applied to the sub-blocks in which the stored prediction information types are 0 and 1, as the motion information; and nothing as the intra prediction mode.

4. The image decoding device according to claim 1, wherein when the stored prediction information type of the sub-block indicates 2 and the prediction type of the sub-block is configured by the inter prediction or the intra prediction applied to the sub-block in which the stored prediction information type is 0 or 1, the circuit stores, in the buffer:

the inter prediction as the prediction type;

motion information to which an inter prediction is applied among the sub-blocks in which the stored prediction information type is 0 or 1, as the motion information; and the intra prediction mode to which the intra prediction is applied among the sub-block in which the stored prediction information type is 0 or 1, as the intra prediction mode.

5. The image decoding device according to claim 1, wherein when the stored prediction information type included in the sub-block indicates 0 or 1 and the prediction type included in the sub-block is the intra prediction, the circuit stores, in the buffer:

the intra prediction as the prediction type;

the motion information configured by the zero vector as the motion information; and the intra prediction mode applied to the sub-block in which the stored prediction information type is 0 or 1, as the intra prediction mode.

6. The image decoding device according to claim 1, wherein when the stored prediction information type included in the sub-block indicates 2 and the prediction type included in the sub-block is the intra prediction, the circuit stores, in the buffer:

the intra prediction as the prediction type;

the motion information configured by the zero vector as the motion information; and both the intra prediction modes applied to the sub-blocks in which the stored prediction information types are 0 and 1, as the intra prediction mode.

7. The image decoding device according to claim 1, wherein when the stored prediction information type included in the sub-block indicates 2 and the prediction type included in the sub-block is the intra prediction, the circuit stores, in the buffer:

the intra prediction as the prediction type;

the motion information configured by the zero vector as the motion information; and as the intra prediction mode, any one intra prediction mode applied to the sub-block in which the stored prediction information type is 0 or 1, the any one intra prediction mode being selected by a predetermined method.

8. The image decoding device according to claim 1, wherein the circuit stores, in the buffer, a motion vector corrected by a merge motion vector difference or inter template matching as a motion vector that is one of parameters configuring the motion information, when storing the motion information.

9. The image decoding device according to claim 1, wherein the circuit stores, in the buffer, a value indicating invalidity of each of flags indicating whether switchable interpolation filter, intra block copy, or local illumination compensation is applied, as one of parameters configuring the motion information, when storing the motion information.

10. The image decoding device according to claim 1, wherein the buffer controls a deletion method of the prediction information according to the prediction information stored in the block to be decoded to which the geometric partitioning mode is applied.

11. The image decoding device according to claim 10, wherein the buffer:

deletes the prediction information when the motion information is no longer referred to from inside or outside the frame in a case where the prediction information stored in the block to be decoded to which the geometric partitioning mode is applied is the motion information, and deletes the prediction information when the motion information is no longer referred to from within the frame in a case where the prediction information stored in the block to be decoded to which the geometric partitioning mode is applied is the intra prediction mode.

12. An image decoding device comprising a circuit and a buffer, wherein:

the circuit derives motion information for a geometric partitioning mode to generate a motion compensation sample;

the circuit derives an intra prediction mode for the geometric partitioning mode to generate an intra-predicted sample;

the buffer stores or outputs prediction information including motion information or an intra prediction mode of a block to be decoded to which the geometric partitioning mode is applied, and a prediction type with which whether inter prediction or intra prediction has been applied can be determined;

the circuit controls a content of the prediction information including motion information or an intra prediction mode applied to a block and a method of storing the prediction information, according to a stored prediction information type calculated in each sub-block configuring the block to be decoded; and the circuit performs weighted averaging on the motion compensation sample and the intra predicted sample with a predetermined weight value to blend a new prediction sample.

13. The image decoding device according to claim 12, wherein the circuit determines the predetermined weight value when the motion compensation sample and the intra predicted sample are weighted and averaged with the predetermined weight value to blend a new prediction sample, based on the prediction information stored in units of sub-blocks in the buffer.

14. An image decoding device comprising a circuit and a buffer, wherein:

the circuit derives motion information for a geometric partitioning mode to generate a motion compensation sample;

the circuit derives an intra prediction mode for the geometric partitioning mode to generate an intra-predicted sample;

the buffer stores or outputs prediction information including motion information or an intra prediction mode of a block to be decoded to which the geometric partitioning mode is applied, and a prediction type with which whether inter prediction or intra prediction has been applied can be determined;

the circuit controls a content of the prediction information including motion information or an intra prediction mode applied to a block and a method of storing the prediction information, according to a stored prediction information type calculated in each sub-block configuring the block to be decoded; and the circuit determines a boundary strength value at a time of applying a deblocking filter for a block boundary, and applies the deblocking filter.

15. The image decoding device according to claim 14, wherein the circuit determines the boundary strength value based on the prediction information stored in units of sub-blocks in the buffer.

16. The image decoding device according to claim 13, wherein the prediction information stored in units of sub-blocks in the buffer includes a prediction type, motion information, and an intra prediction mode.

17. An image decoding method, comprising:

deriving motion information for a geometric partitioning mode to generate motion compensation samples;

deriving an intra prediction mode for the geometric partitioning mode to generate an intra predicted sample;

storing or outputting prediction information including motion information or an intra prediction mode of a block to be decoded to which the geometric partitioning mode is applied, and a prediction type with which it can be determined whether inter prediction or intra prediction has been applied; and controlling a content of the prediction information including motion information or an intra prediction mode applied to a block and a method of storing the prediction information, according to a stored prediction information type calculated in each sub-block configuring the block to be decoded.

18. A non-transitory computer-readable medium storing a program thereon, the program being executable by a computer to control the computer to function as an image decoding device, and the image decoding device comprising a circuit and a buffer, wherein:

the circuit:

derives motion information for a geometric partitioning mode to generate a motion compensation sample; and derives an intra prediction mode for the geometric partitioning mode to generate an intra-predicted sample;

the buffer stores or output prediction information including motion information or an intra prediction mode of a block to be decoded to which the geometric partitioning mode is applied, and a prediction type with which it can be determined whether inter prediction or intra prediction has been applied; and the circuit controls a content of the prediction information including motion information or an intra prediction mode applied to a block and a method of storing the prediction information, according to a stored prediction information type calculated in each sub-block configuring the block to be decoded.

* * * * *